(12) United States Patent
Thayer et al.

(10) Patent No.: US 9,075,845 B1
(45) Date of Patent: Jul. 7, 2015

(54) CORRELATING AND RECONCILING DESCRIPTOR DATA ASSOCIATED WITH COMPUTING SYSTEMS

(71) Applicants: Nicholas D. Thayer, Loveland, CO (US); Roger H. Dev, Fort Collins, CO (US); Jeffrey B. Thompson, Fort Collins, CO (US)

(72) Inventors: Nicholas D. Thayer, Loveland, CO (US); Roger H. Dev, Fort Collins, CO (US); Jeffrey B. Thompson, Fort Collins, CO (US)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 14/108,027

(22) Filed: Dec. 16, 2013

(51) Int. Cl.
  *G06F 3/00* (2006.01)
  *G06F 15/173* (2006.01)
  *G06F 11/30* (2006.01)

(52) U.S. Cl.
  CPC .................................. *G06F 11/3051* (2013.01)

(58) Field of Classification Search
  None
  See application file for complete search history.

(56) References Cited

U.S. PATENT DOCUMENTS

| | | | |
|---|---|---|---|
| 7,555,570 B2* | 6/2009 | Hickey et al. | 710/8 |
| 7,840,723 B1* | 11/2010 | Kemkar | 710/36 |
| 7,934,248 B1* | 4/2011 | Yehuda et al. | 726/1 |
| 8,215,549 B2* | 7/2012 | Arpino | 235/385 |
| 2003/0093439 A1* | 5/2003 | Mogi et al. | 707/200 |
| 2004/0153344 A1* | 8/2004 | Bui et al. | 705/3 |
| 2006/0271656 A1* | 11/2006 | Yagawa | 709/223 |
| 2007/0124721 A1* | 5/2007 | Cowing et al. | 717/100 |
| 2011/0016156 A1* | 1/2011 | Golobay et al. | 707/803 |
| 2011/0072465 A1* | 3/2011 | Lee et al. | 725/45 |
| 2012/0062712 A1* | 3/2012 | Kesseler et al. | 348/56 |
| 2013/0073573 A1* | 3/2013 | Huang et al. | 707/755 |

* cited by examiner

*Primary Examiner* — Michael Sun
(74) *Attorney, Agent, or Firm* — Baker Botts L.L.P.

(57) ABSTRACT

A system includes a memory operable to store instructions and a processor communicatively coupled to the memory and operable, upon executing the instructions, to determine that first probe information is associated with first device information based on the first probe information, determine that second probe information is associated with the first device information and second device information based on the second probe information, and determine that third probe information is associated with second device information based on the third probe information. The processor may be further operable, upon executing the instructions to modify the first device information to include particular information from the first probe information and particular information from the second probe information, and modify the second device information to include particular information from the second probe information and particular information from the third probe information.

21 Claims, 6 Drawing Sheets

CORRELATING AND RECONCILING DESCRIPTOR DATA ASSOCIATED WITH COMPUTING SYSTEMS

BACKGROUND

A distributed computing environment typically utilizes various computing systems that may communicate over a network while performing various operations. One or more aspects of these computing systems (e.g., properties of the computing systems) may be monitored or tracked by probes installed on the computing systems. However, such probes may send incoherent and fragmented information about the computing device, causing disparate perspective views into the operation or composition of the computing device.

SUMMARY

According to one embodiment of the disclosure, a method includes determining that first probe information is associated with first device information based on the first probe information, the first device information comprising information about a first device, the first probe information being associated with a first probe installed on the first device and comprising information about a first property of the first device. The method also includes determining that second probe information is associated with the first device information and second device information based on the second probe information, the second probe information being associated with a second probe installed on the first device, the second probe information comprising information about a second property of the first device and information about a first property of a second device. The method further includes determining that third probe information is associated with second device information based on the third probe information, the third probe information being associated with a third probe installed on a second device and comprising information about a second property of the second device. The method further includes modifying the first device information to include particular information from the first probe information and particular information from the second probe information, and modifying the second device information to include particular information from the second probe information and particular information from the third probe information.

Other objects, features, and advantages of the present disclosure are apparent to persons of ordinary skill in the art in view of the following detailed description of the disclosure and the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
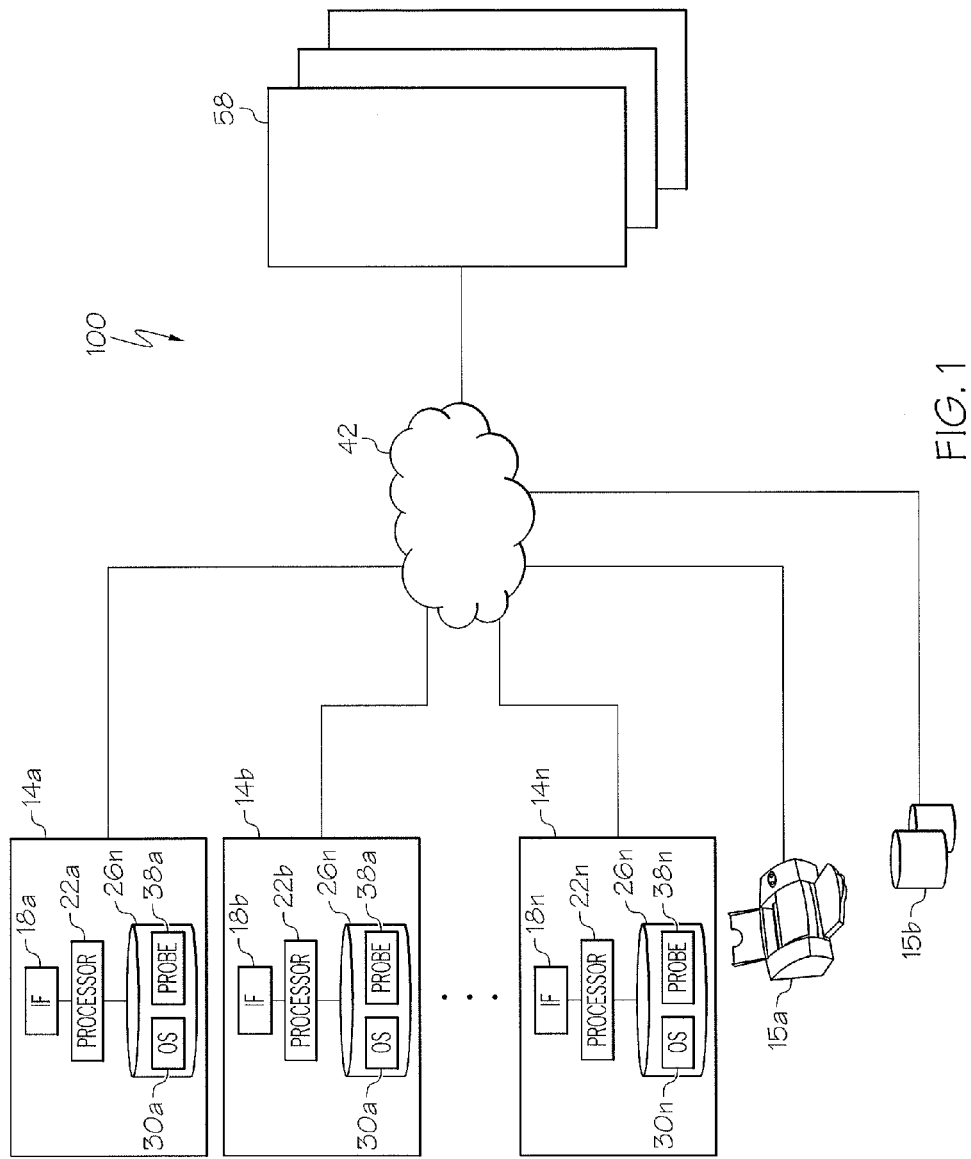
FIG. 1 illustrates a system for retrieving and organizing information received from probes installed on host devices according to one embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

FIG. 1 illustrates a system 100 for retrieving and organizing information received from probes 38 installed on host devices 14 according to one embodiment of the present disclosure. As illustrated, system 100 includes host devices 14 and probes 38 installed on host devices 14. It will be understood that host devices 14 may include any type of computing device, and may include virtual instances of computing devices such as virtual machines. System 100 also includes peripheral devices 15 (e.g., printers such as printer 15a and network attached storage (NAS) such as NAS 15b) that may be connected to host devices 14. It will be understood that peripheral devices 15 may include any type of computing device, and may include virtual instances of computing devices such as virtual machines. Host devices 14 and peripheral devices 15 may be interconnected through network 42, which may connect host devices 14 and peripheral devices 15 to a database 58. In particular embodiments, probes 38 may retrieve information associated with host devices 14 and/or peripheral devices 15. Any information (or data) associated with host devices 14 may be monitored, such as any suitable combination of information regarding components (i.e., processor(s), memory, and/or storage device(s)) of a host device 14 and/or peripheral device 15, software (e.g., applications) and/or firmware installed on a host device 14 and/or peripheral device 15, relationships between host devices 14 and/or peripheral devices 15, information regarding virtualization (e.g., in cloud computing architectures) associated with a host device 14 and/or peripheral device 15, or any other information associated with a host device 14 and/or peripheral device 15. Probes 38 may gather such information associated with host devices 14 and/or peripheral devices 15 and provide it to database 58 for storage.

In particular embodiments, probes 38 may send infrastructure under management (IUM) descriptors that include information about one or more host devices 14 or peripheral devices 15 being monitored by the probe. An IUM may refer to a particular set of one or more host devices or peripheral devices 15 being monitored by a probe. For example, an IUM may include a single host device 14. As another example, an IUM may include a host device 14 and a peripheral device 15. As yet another example, an IUM may include a single peripheral device 15. In particular embodiments, the information contained in the IUM descriptors sent by probes 38 may include one or more properties relating to the IUM. For example, the properties may include hostname information, network information, hardware information, software information, and/or relationship information (i.e., how a device or devices of the IUM are connected with other devices on network 42) relating to the IUM.

In particular embodiments, the information gathered by probes 38 and sent in IUM descriptors may be fragmented, i.e. the information may only represent a small portion of information about the host device 14 or peripheral device 15. For example, one piece of information sent by a probe 38 may only include a device name and IP address, while another piece of information sent by a probe 38 may include information about that device's components or software. Storage of the information in this fragmented fashion may lead to a very disorganized database 58 of information about host devices 14 and peripheral devices 15, wherein information about a particular host device 14 or peripheral device 15 is not easily accessible due to the fragmentation. Accordingly, in particular embodiments, the information associated with the host devices 14 and/or peripheral devices 15 sent by probes 38 to database 58 may be first organized before storage at database 58. This may include, in particular embodiments, correlation of the information sent by probes 38 and reconciliation of the information sent by probes 38.

Correlation of the information sent by probes 38 may refer to associating the fragmented pieces of information sent by probe 38 with a single element that represents a unified view of the device being monitored. As an example, correlation may include determining that information in a first IUM descriptor about hardware components (e.g., processors or memory), information in a second IUM descriptor about software components (e.g., an operating system or application), information in a third IUM descriptor about network properties (e.g., IP address and/or MAC address), and information in a fourth IUM descriptor about network or other interface connections of a particular computer on a network are each associated with a single master element in database 58 that represents the unified, overall view of the particular computer and its relationships with other computers on the network.

Reconciliation of the information sent by probes 38 may refer to the gathering of the correlated information into the single element in database 58 that represents the unified, overall view of host device 14 and its relationships with other devices on network 42. Using the above example for correlation, reconciliation may include copying the information from the first, second, third, and fourth IUM descriptors into the single master element that represents the overall view of the particular computer. In other words, the information about the hardware components, software components, network properties, and network connections are imported into the master element representing the overall view of the particular computer such that all information gathered about the computer is in one, central location/element in the database. Accordingly, one may be able to view all the information about the computer at once instead of having to look at the information in each of the IUM descriptors separately. Further example correlation and reconciliation functions are described below at FIGS. 2-6. Such correlation and reconciliation may be performed by any device or devices connected to network 42, such as one or more of host devices 14, one or more of peripheral devices 15, or database 58.

Host device 14 represents any components (i.e., any suitable combination of hardware, firmware, and/or software) operable to process information. Host device 14 may include a network server, any remote server, a mainframe, a host computer, a workstation, a web space server, a personal computer, a file server, a virtual device, or any other suitable combination of hardware, firmware, and/or software that may process information. The functions of host device 14 may be performed by any combination of one or more computer systems or other processing devices at one or more locations. In the embodiment where the module is a server, the server may be a private server, and the server may be a virtual or physical server. The server may include one or more servers at the same or remote locations. Also, host device 14 may include any component that functions as a server. Host device 14 may include an operating system that manages resources and provides services for computer programs installed on host device 14, in particular embodiments. Host device 14 may include (and/or may otherwise be associated with) information that may be monitored. In the illustrated embodiment, host device 14 includes a network interface 18, a processor 22, and a memory 26.

Network interface 18 represents any components (i.e., any suitable combination of hardware, firmware, and/or software) operable to receive information from network 42, transmit information through network 42, perform processing of information, communicate to other devices, or any combination of the preceding. For example, network interface 18 may receive information from a peripheral device 15. As another example, network interface 18 may communicate information to database 58. Network interface 18 represents any port or connection, real or virtual, including any suitable hardware and/or software, including protocol conversion and data processing capabilities, to communicate through a LAN, a metropolitan area network (MAN), a WAN, or other communication system that allows host device 14 to exchange information with peripheral devices 15, other host devices 14, database 58, or other components of system 100.

Processor 22 communicatively couples to network interface 18 and memory 26, and controls the operation and administration of host device 14 by processing information received from network interface 18 and memory 26. Processor 22 includes any suitable combination of hardware, firmware, and/or software that operates to control and process information. For example, processor 22 executes operating system 30 to manage resources and provide services for one or more applications and/or computer programs. Processor 22 may be a programmable logic device, a microcontroller, a microprocessor, any processing device, or any combination of the preceding.

Memory 26 stores, either permanently or temporarily, data, operational software, or other information for processor 22. Memory 26 includes any one or a combination of volatile or non-volatile local or remote devices suitable for storing information. For example, memory 26 may include RAM, ROM, magnetic storage devices, optical storage devices, or any other information storage device or a combination of these devices. While illustrated as including particular modules, memory 26 may include any information for use in the operation of host device 14.

In the illustrated embodiment, memory 26 includes operating system 30 and probes 38. Operating system 30 represents any suitable set of instructions, logic, or code embodied in a computer readable storage medium and operable to manage resources and provide services for one or more applications and/or computer programs. Operating system 30 may include any suitable operating systems, such as IBM's zSeries/Operating System (z/05), MS-DOS, PC-DOS, MAC-OS (such as MAC OS X), WINDOWS, UNIX, OpenVMS, LINUX, SOLARIS, ADVANCED INTERACTIVE EXECUTIVE (AIX), HP-UX, UBUNTU, DEBIAN, or any other appropriate operating systems, including future operating systems.

Probe 38 represents any suitable set of instructions, logic, or code embodied in a computer readable storage medium and operable to monitor information associated with host devices 14 and/or associated with peripheral devices 15 connected to host devices 14 through network 42. Probe 38 may be implemented using any suitable combination of hardware, firmware, and/or software. A probe 38 may perform a particular function associated with retrieving information about the host device 14 on which it is installed and/or peripheral device(s) 15 attached to the host device 14 on which probe 38 is installed. For example, a probe 38 may retrieve a first type of information about host device 14 (e.g., device IP address) and also a second type of information about host device 14 (e.g., the host's hardware and/or software). In addition, probe 38 may retrieve information about a peripheral device 15, such as a printer, attached to host device 14. The types of information that a probe 38 may retrieve may include, without limitation: (1) network-based information; (2) application-based information; (3) virtualization-based information; (4) storage-based information; and (5) component-based information. As just a few examples, a probe 38 may retrieve information about any suitable combination of information regarding applications installed on host devices 14 (such as what applications are installed, what applications are currently running, what applications have expired service contracts, etc.), information regarding any host device 14 and/or any peripheral devices 15 connected to the host device 14 (e.g., network devices or local devices), information regarding virtualization associated with a host device 14, if available or determinable (such as whether a device is a virtual machine or hosts virtual machines), information regarding storage associated with a host device 14 (such as how much storage is currently being used, how much storage is not being used, the type of storage (e.g., RAM, ROM, etc.), etc.), information regarding components of the host device 14 (such as the hardware components of the device (e.g., CPU or GPU processors)), and any other information associated with a host device 14 and/or peripheral device 15.

Although FIG. 1 is illustrated as only including three host devices 14 (e.g., host device 14a, host device 14b, and host device 14n), any number of host devices 14 may be included in system 100. For example, system 100 may include a single host device 14, ten host devices 14, one hundred host devices 14, one thousand host devices 14, or any other number of host devices 14. Similarly, although FIG. 1 is illustrated as only including two peripheral devices 15 (e.g., printer 15a and NAS 15b), any number of peripheral devices 15 may be included in system 100. For example, system 100 may include a single peripheral device 14, ten peripheral devices 14, one hundred peripheral devices 14, one thousand peripheral devices 14, or any other number of peripheral devices 14. Additionally, although host device 14 has been described above as including a probes 38 and peripheral device 15 has been described as not including a probe 38, in particular embodiments, one or more host devices 14 may not include a probe 38 and one or more of peripheral devices 15 may include a probe 38.

Network 42 represents any network operable to facilitate communication between various components of system 100, such as host devices 14, peripheral devices 15, and database 58. Network 42 may include any interconnecting system capable of transmitting audio, video, signals, data, messages, or any combination of the preceding. Network 42 may include all or a portion of a public switched telephone network (PSTN), a public or private data network, a LAN, a MAN, a WAN, a local, regional, or global communication or computer network, such as the Internet, a wireline or wireless network, an enterprise intranet, or any other communication link, including combinations thereof, operable to facilitate communication between the components.

Database 58 represents any components that may store information monitored by probes 38. For example, database 58 may store information monitored by probes 38 and communicated to database 58 for storage. Database 58 may include a network server, any remote server, a mainframe, a host computer, a workstation, a web space server, a personal computer, a file server, a virtual device, or any other device that may store information monitored by probes 38. The functions of database 58 may be performed by any combination of one or more servers or other components at one or more locations. In the embodiment where the module is a server, the server may be a private server, and the server may be a virtual or physical server. The server may include one or more servers at the same or remote locations. In addition to storing information monitored by probes 38, database 58 may further provide the information for view by a user. For example, a user may send a message to database 58 that requests particular information from database 58. As such, database 58 may gather such information and communicate it for view by a user on a user device (not shown) or on a host device 14.

Modifications, additions, or omissions may be made to system 100 without departing from the scope of the invention. Additionally, system 100 may include any number of host devices 14, peripheral devices 15, networks 42, and/or databases 58. Furthermore, any suitable logic may perform the functions of system 100 and the components within system 100.

Figure 2:
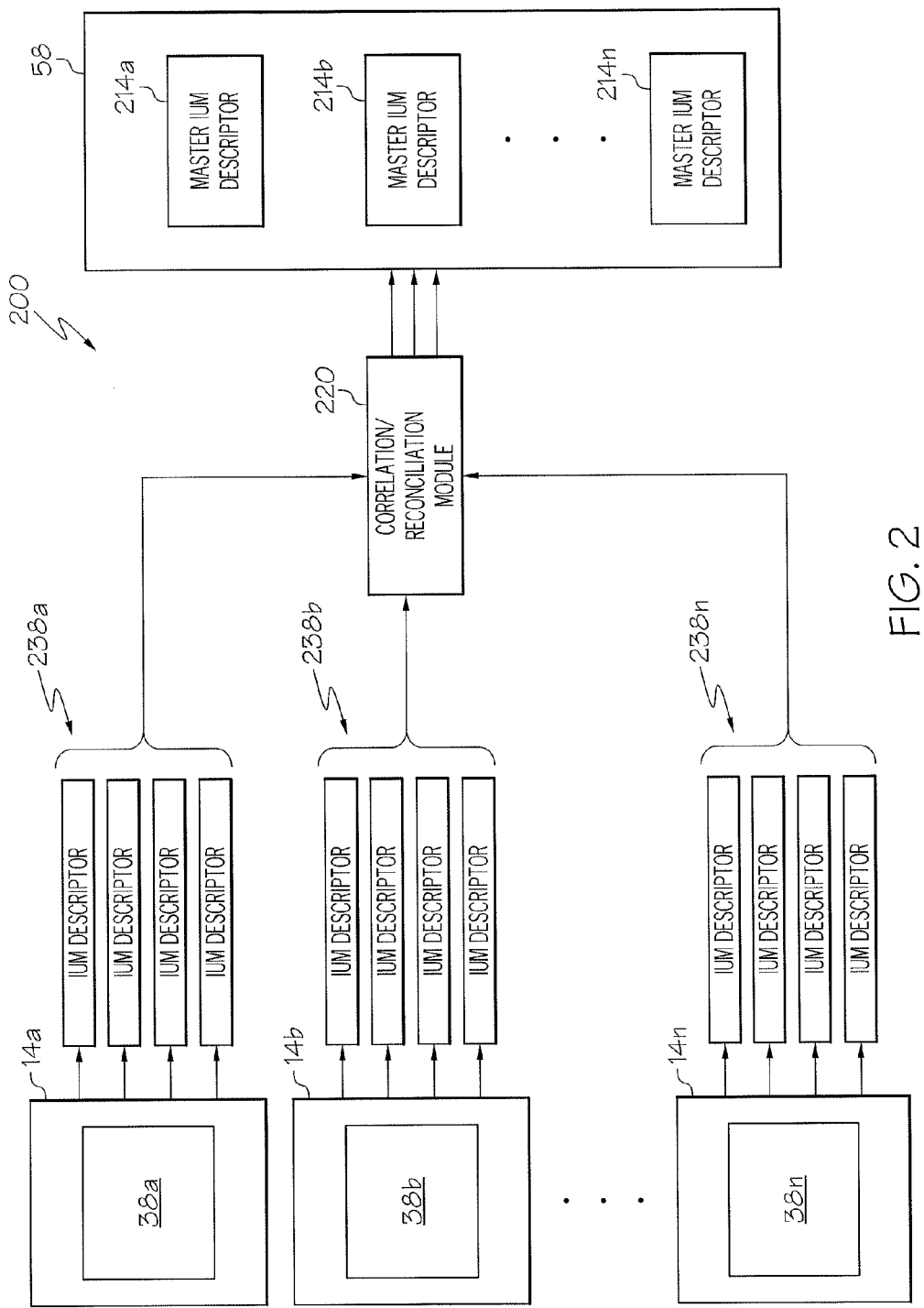
FIG. 2 illustrates an example system for associating elements of Infrastructure Under Management (IUM) descriptors received from probes on host devices according to one embodiment of the present disclosure.

FIG. 2 illustrates an example system 200 for associating elements of Infrastructure Under Management (IUM) descriptors 238 received from probes 38 on host devices 14 according to one embodiment of the present disclosure. As described above, probes 38 on host devices 14 may send information, e.g., IUM descriptors 238, to a correlation and reconciliation module 210 that describes the host device 14 (and/or a peripheral device 15 attached thereto) that the probe 38 is monitoring. For example, a probe 38 may be installed on a particular host device 14, but may monitor and gather information associated with the particular host device 14 and one or more peripheral devices 15 connected thereto. As another example, a probe 38 may be installed on a particular host device 14, but may monitor and gather information associated with the particular host device 14 and also other host devices 14 that do not have probes 38 installed thereon. After receiving the IUM descriptors 238 from probes 38, correlation and reconciliation module 220 may organize the potentially fragmented information in the IUM descriptors 238 received from the probes 38 into a coherent and unified description of the IUMs being monitored by probes 38. The unified description may then be stored in a master IUM descriptor 214 in database 58, as shown in FIG. 2.

In particular embodiments, the information in IUM descriptors 238 may include various levels of information about one or more host devices 14 or one or more peripheral devices 15 being monitored by probe 38. In addition, IUM descriptors 238 may include either unique or overlapping information about the host device 14 or peripheral device 15 being monitored. The information received from multiple IUM descriptors 238 describing a host device 14 or peripheral device 15 may therefore be inconsistent or contradictory in some instances. The correlation and reconciliation operations may thus enhance the process of gathering information about the IUMs through automated organization of the various bits of information in the IUM descriptors 238, and allowing for the gathering, organization, and storage of device information for multiple levels of a monitored environment such as system 100 of FIG. 1. For example, instead of merely being able to gather and store information about an infrastructure at the device level as in current systems (e.g., discovering devices by network requests for IP address information and mapping the infrastructure according to those addresses), embodiments of the present disclosure that include correlation and reconciliation operations may allow for the gathering of information about devices at other levels, such as hardware or software levels (e.g., processors, memory, storage devices, applications, and/or the various levels of virtualized environments hosted on the host device). Systems according to the present disclosure, therefore, may allow for an automated way to compile a more complete view of an infrastructure and the devices that are in the infrastructure.

In particular embodiments, IUM descriptors 238 may each comprise one or more fields of information, such as information about a name of the device or component (software or hardware), a type of the device or component (software or hardware), properties of the device or component (software or hardware), and/or a relationship between the device or component (software or hardware) and another device or component of the IUM. The name information may be any suitable information identifying the device or component (software or hardware) monitored by the probe (e.g., a hostname). Similarly, the type information may be any suitable information identifying a type of the device or component (software or hardware) monitored by the probe (e.g., a workstation, a virtual machine, a processor, or an application). Properties may include any relevant information about the device of component (software or hardware) not included in the name or type information. For example, properties may include IP addresses, MAC addresses, virtualization identifiers (e.g., VSPHERE or VMWARE), disk identifiers (e.g., SAN identifiers), operating system identifiers (e.g., WIN- DOWS or UNIX), operational status, or any other suitable properties of a device or component (software or hardware) being monitored by a probe 38. Relationship information may include any suitable information that indicates one or more relationships that the device or component (software or hardware) has with other devices or components (software or hardware). One example of relationship information may include a "composed of" relationship, wherein the IUM descriptor 238 may describe what a particular host device 14 is composed of (e.g., software or hardware components such as processors, memory, or applications). Another example of a relationship may include a "connected to" relationship, wherein the IUM descriptor 238 may describe another device to which its host device 14 is connected (e.g., a peripheral device 15).

Correlation and reconciliation module 220 may be implemented using any suitable combination of hardware, firmware, and/or software. Although correlation and reconciliation module 220 is illustrated as a single module that performs both correlation and reconciliation functions in FIG. 2, system 200 may instead comprise separate correlation and reconciliation modules for performing the correlation and reconciliation functions independently of one another. In addition, although illustrated as a separate module from database 58 and host devices 14, it will be understood that correlation and reconciliation module may be located in any suitable location of FIG. 1. For example, each host device 14 may have a correlation and reconciliation module residing on it that correlates each IUM descriptor with a master IUM descriptor and reconciles the IUM descriptor information into the master IUM descriptor before sending the master IUM descriptor on to the database 58. Similarly, for each IUM, there may be a particular correlation and reconciliation module associated with the IUM that is separate and distinct from the IUM that it monitors. Such systems may be referred to as distributed systems (i.e., the correlation and reconciliation modules are distributed among the IUMs on the network). As another example, there may be a single correlation and reconciliation module 220 residing in the system (such as shown in FIG. 1) that performs all correlation and reconciliation functions for all IUM descriptors coming from probes. This may be referred to as a centralized system (i.e., all correlation and reconciliation operations are performed at a centralized system on the network). In such a system, correlation and reconciliation module 220 may be located in any suitable location on network 42 (e.g., on one or more servers of database 58). In certain embodiments, there may be a combination or hybrid of the distributed and centralized systems. For instance, there may be a correlation and reconciliation module assigned to monitor a certain number, but not all, of IUMs, and each correlation and reconciliation module may then send the master IUM descriptors to database 58.

In particular embodiments, when the IUM descriptors 238 are received from the probes 38, correlation and reconciliation module 220 may correlate the information received according to one or more rules. Examples of rules may include rules for name matches between elements (either full or partial matches) or rules for type matches between elements (either full or partial matches). In certain embodiments, all rules may be analyzed until either one of the rules matches an incoming IUM descriptor 238 to a master IUM descriptor 214, or until the set of rules is exhausted. A master IUM descriptor may refer to an element in a host descriptor that contains a complete view of all perspective views (i.e., properties and relationships) of a device or component being monitored provided by the various IUM descriptors sent by a probe. When a rule match is found, the IUM descriptor 238 being analyzed may be associated with a matching master IUM descriptor 214 in database 58. If, however, the set of rules is exhausted without finding a match, a new master IUM descriptor 214 is created in database 58 based on the information contained in the IUM descriptor 238. An example correlation function is shown in FIGS. 3 and 4 and described further in their accompanying descriptions below.

Figure 5:
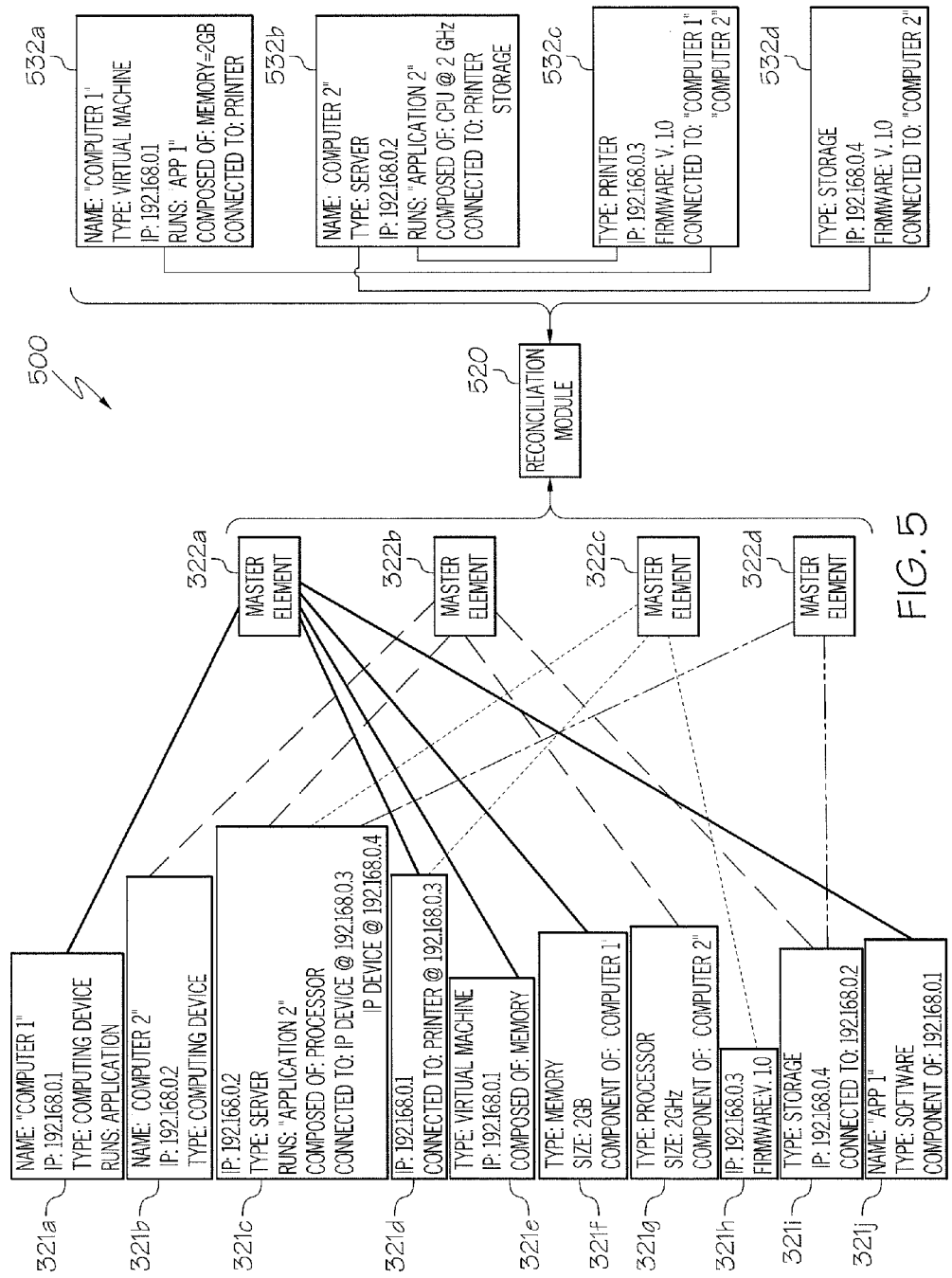
FIG. 5 illustrates an example reconciliation operation performed on correlated descriptor elements and master elements according to one embodiment of the present disclosure.
Figure 6:
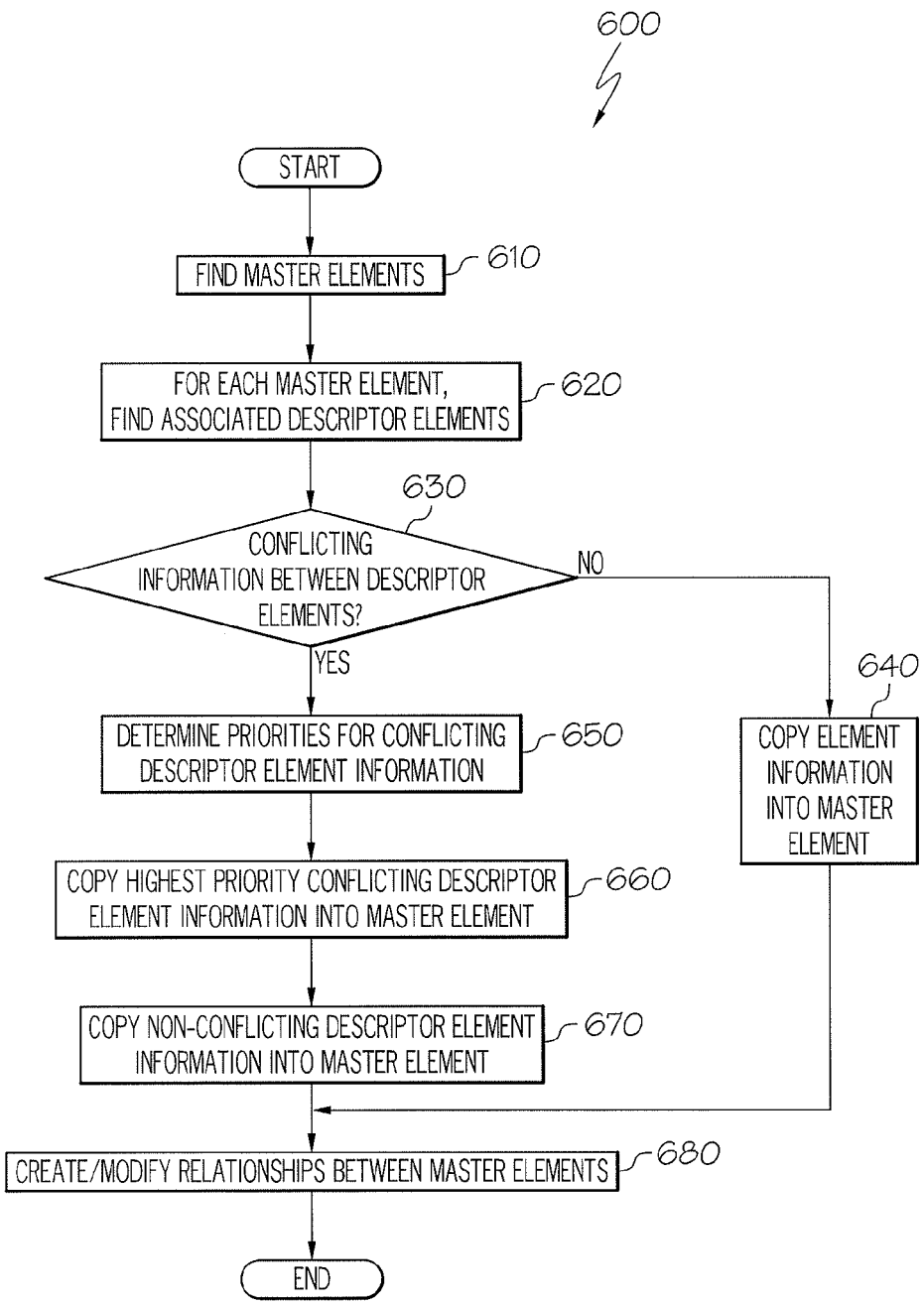
FIG. 6 illustrates an example method for reconciling correlated descriptor elements and master elements as illustrated in FIG. 5 according to one embodiment of the present disclosure.

Once the IUM descriptors 238 have been correlated with master IUM descriptors 214, correlation and reconciliation module 220 may then reconcile the correlated IUM descriptor information in order to merge the information into the master IUM descriptor 214, which may provide a more complete view of the various perspectives offered by the various IUM descriptors 238 in a single location. For example, rather than seeing many pieces of information relating to the various hardware and software components of a device separately from one another (i.e., in each of the IUM descriptors 238 associated with a device), a user may be able to view all of the information about the device in a single location/view (i.e., the master IUM descriptor 214). Reconciliation may include, in particular embodiments, the merging of the properties of the various IUM descriptors 238 associated with a master IUM descriptor 214. In addition, reconciliation may include promoting the relationships of the constituent IUM descriptors 238 into the master IUM descriptor 214 such that the relationship is indicated at the master IUM descriptor level. An example reconciliation function is shown in FIGS. 5 and 6 and described further in their accompanying descriptions below.

Modifications, additions, or omissions may be made to system 200 without departing from the scope of the invention. Additionally, system 200 may include any number of host devices 14, peripheral devices 15 (not shown in FIG. 2), correlation and reconciliation modules 220, and/or databases 58. Furthermore, any suitable logic may perform the functions of system 200 and the components within system 200.

Figure 3:
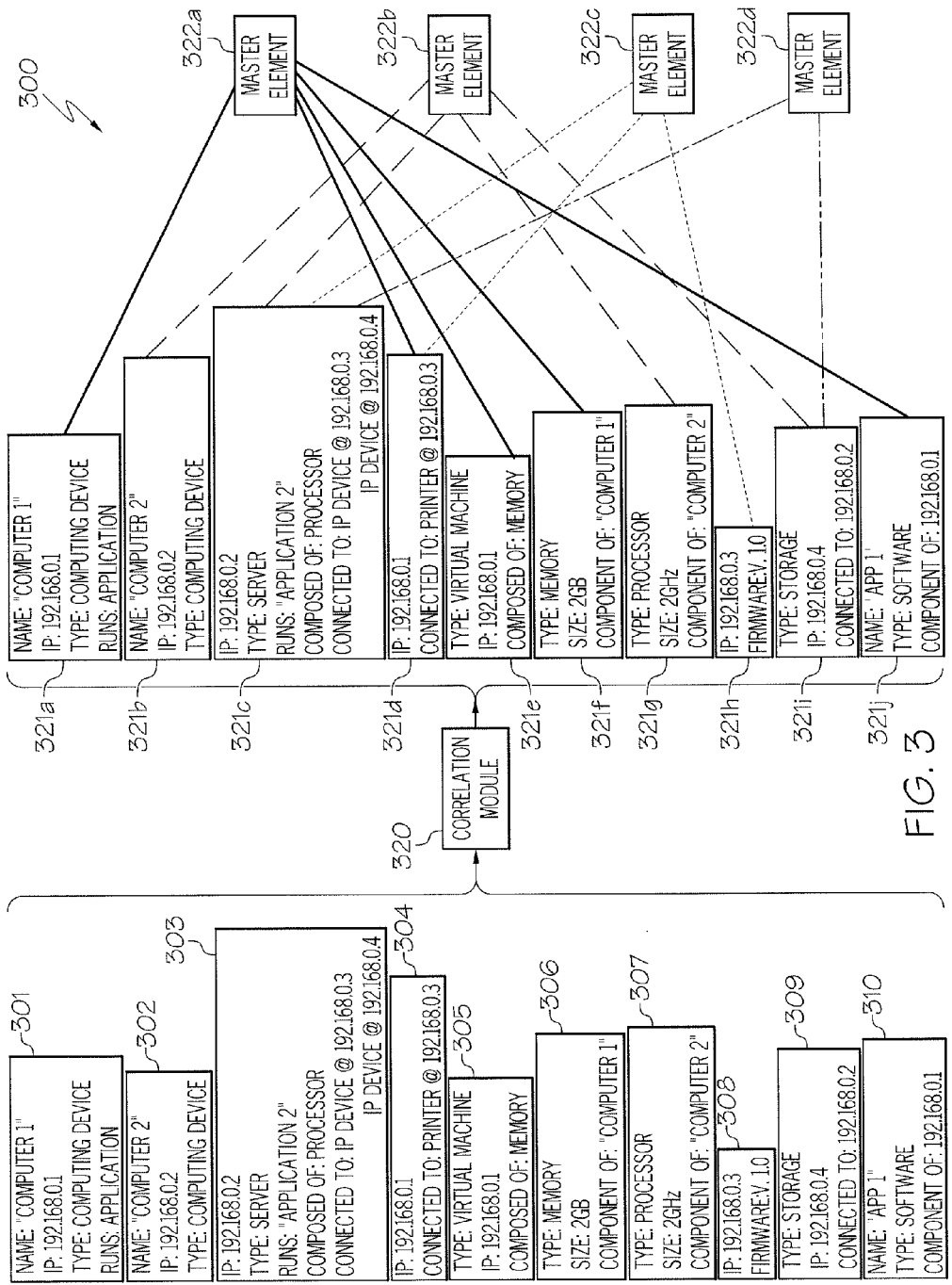
FIG. 3 illustrates an example correlation operation performed on IUM descriptors received from probes on host devices (and/or peripheral devices) according to one embodiment of the present disclosure.
Figure 4:
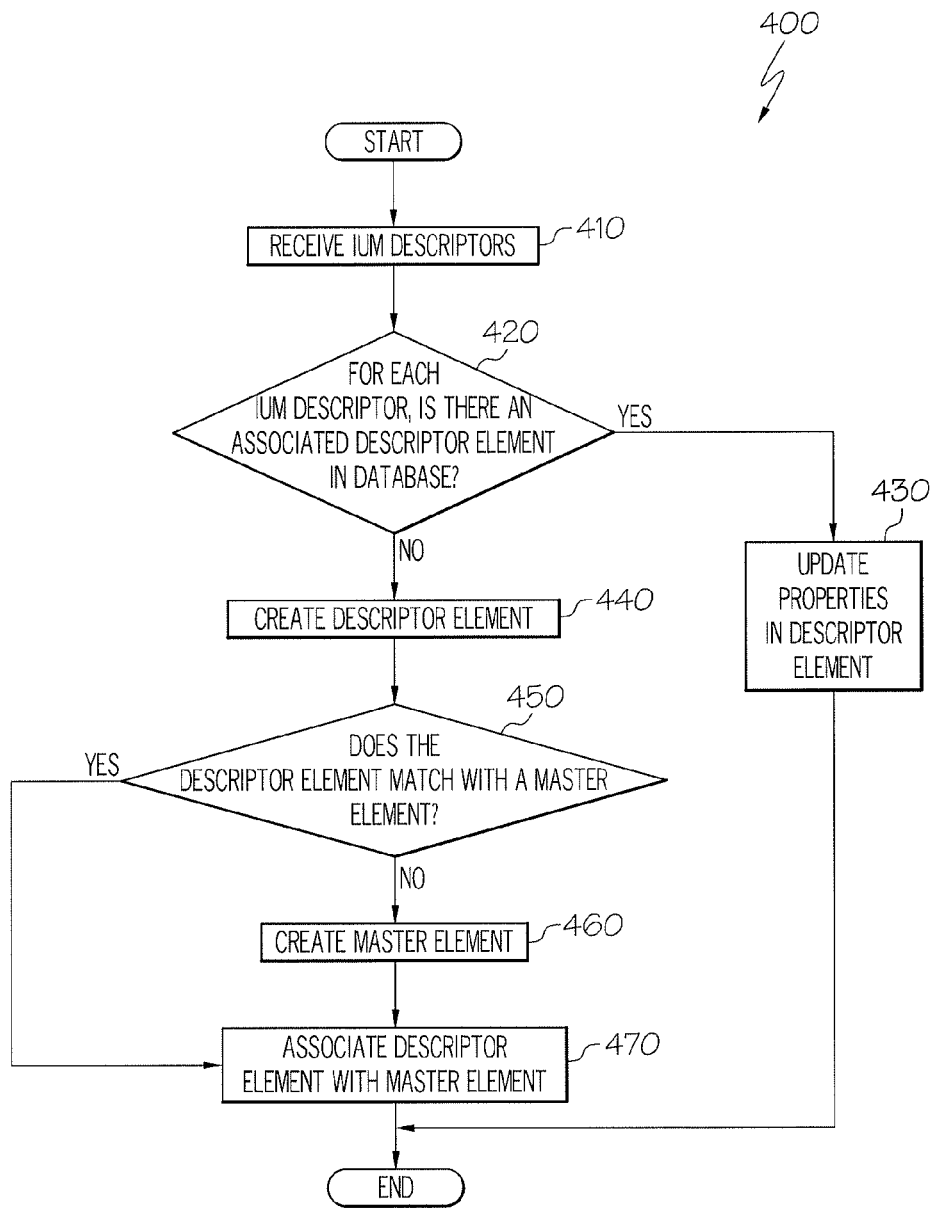
FIG. 4 illustrates an example method for correlating IUM descriptors received from probes on host devices (and/or peripheral devices) as illustrated in FIG. 3 according to one embodiment of the present disclosure.

FIG. 3 illustrates an example correlation operation performed on IUM descriptors 301-310 received from probes 38 on host devices 14 (and/or peripheral devices 15) according to one embodiment of the present disclosure. IUM descriptors 301-310 may contain any suitable information about the host device 14 or peripheral device 15 being monitored by the probe 38 that sent the IUM descriptor. For example, IUM descriptor 301 includes information about a device named "Computer1," and shows that it is a computing device with IP address 192.168.0.1 running an application. As another example, IUM descriptor 302 includes information about a device named "Computer2," and shows that it is a computing device with IP address 192.168.0.2. As another example, IUM descriptor 303 includes information about a server type device with IP address 192.168.0.2 running software "Application2," composed of a processor, and connected to two IP devices at IP addresses 192.168.0.3 and 192.168.0.4. As another example, IUM descriptor 304 includes information about a device with IP address 192.168.0.1 that is connected to a printer type device at IP address 192.168.0.3. As another example, IUM descriptor 305 includes information about a virtual machine type device with IP address 192.168.0.1 and composed of memory. As another example, IUM descriptor 306 includes information about 2 GB of memory, which is a component of a device named "Computer 1." As another example, IUM descriptor 307 includes information about a processor with a speed of 2 GHz, which is a component of a device named "Computer2." As another example, IUM descriptor 308 includes information about a device with IP address 192.168.0.3 having a firmware of version 1.0. As another example, IUM descriptor 309 includes information about a storage type device with IP address 192.168.0.4 that is connected to a device with IP address 192.168.0.2. As another example, IUM descriptor 310 includes information about a software component named "App1," which is a component of a device with IP address 192.168.0.2.

In particular embodiments, each of IUM descriptors 301-310 received at a correlation module 320 may be first copied into a descriptor element 321 associated with the IUM descriptor 301-310, and then analyzed using one or more rules to determine whether the information contained within the descriptor element 321/IUM descriptor 301-310 correlates (i.e., is associated with) a master element 322. For example, in the example shown in FIG. 3, correlation module 320 may first receive IUM descriptor 301, create descriptor element 321*a* (if it does not yet exist), and then copy the information from IUM descriptor 301 into the corresponding descriptor element 321 (i.e., descriptor element 321*a*). If the descriptor element 321 already exists, correlation module 320 may determine whether there is any updated information in the received IUM descriptor and update the information in descriptor element 321 as appropriate. The same operations may be performed by correlation module 320 for the remaining IUM descriptors 302-310.

After an IUM descriptor is received and copied into a corresponding descriptor element 321, correlation module 320 may then determine whether there is a master element 322 in the database that is associated with the descriptor element 321. In other words, correlation module 320 may determine whether a descriptor element 321 has a perspective or has information pertaining to the device being represented by a master element 322. The association between descriptor elements 321 and a master element 322 may be determined, in particular embodiments, using a set of rules. This may include matching certain properties included in the IUM descriptors/descriptor elements. For example, referring to FIG. 3, once master element 322*a* has been created, an association may be made between itself and descriptor elements 321*a*, 321*d*, and 321*e* by determining that each descriptor element includes information about the device at IP address 192.168.0.1. Further, descriptor elements 321*a* and 321*f* may be determined to be associated with master element 322*a* since both descriptor elements have information regarding the same device based on the device name in the descriptors (i.e., "Computer1").

If there is an associated master element 322 already in the database, correlation module 320 may create an association in the database between the descriptor element 321 and master element 322. The associations between descriptor elements 321 and master elements 322 may be created using any suitable means for associating data elements or entries in a database. If there is not an associated master element 322, then correlation module 320 will first create one before making the association in the database. The same association operations (and creation operations, where necessary) may be performed by correlation module 320 for all remaining IUM descriptors.

Using the illustrated example, and assuming that IUM descriptors 301-310 are received in the order 301, 302, 303, 304, 305, 306, 307, 308, 309, and then 310, correlation module 320 may first receive IUM descriptor 301 and determine that there is no descriptor element 321 associated with the information contained in IUM descriptor 301. Correlation module 320 may therefore create descriptor element 321*a*. Correlation module 320 may then determine that there is no master element 322 that may be associated with descriptor element 321*a*. This is because there is no master element 322 that matches any of the information contained in IUM descriptor 301/descriptor element 321*a* about the component or device being monitored (e.g., the name, IP address, or device type information). Correlation module 320 may accordingly create master element 322*a* and associate descriptor element 321*a* with master element 322*a*.

Next, IUM descriptor 302 is received. Correlation module 320 may determine that there is no descriptor element 321 associated with the information contained in IUM descriptor 302, and may therefore create descriptor element 321*b*. Correlation module 320 may then determine that there is no master element 322 that may be associated with 321*b*. This is because there is no master element 322 that matches any of the information contained in IUM descriptor 302/descriptor element 321*b* about the component or device being monitored (e.g., the name, IP address, or device type information). Correlation module 320 may accordingly create master element 322*b* and associate descriptor element 321*b* with master element 322*b*.

Next, IUM descriptor 303 is received. Correlation module 320 may determine that there is no descriptor element 321 associated with the information contained in IUM descriptor 303, and may therefore create descriptor element 321*c*. Correlation module 320 may then determine that descriptor element 321*c* is associated with master element 322*b* (e.g., because of the matching IP address), and may therefore associate descriptor element 321*c* with master element 322*b*. Correlation module may also determine that descriptor element 321*c* has further information about other devices for which master elements are not yet created (e.g., the IP devices at IP addresses 192.168.0.3 and 192.168.0.4), and may accordingly create master elements 322*c* and 322*d* and associate descriptor element 321*c* with each of master elements 322*c* and 322*d*. This is because there is no master element 322 that matches any of the information contained in IUM descriptor 303/descriptor element 321*c* for the IP addresses 192.168.0.3 and 192.168.0.4.

Next, IUM descriptor 304 is received. Correlation module 320 may determine that there is no descriptor element 321 associated with the information contained in IUM descriptor 304, and may therefore create descriptor element 321*d*. Correlation module 320 may then determine that descriptor element 321*d* is associated with master element 322*a* due to the matching IP address as descriptor element 321*a*. In addition, correlation module 320 may determine that descriptor element 321*d* is associated with master element 322*c* due to the indicated relationship with Printer @ 192.168.0.3. Correlation module 320 may accordingly associate descriptor element 321*d* with each of master elements 322*a* and 322*c*.

Next, IUM descriptor 305 is received. Correlation module 320 may determine that there is no descriptor element 321 associated with the information contained in IUM descriptor 305, and may therefore create descriptor element 321*e*. Correlation module 320 may then determine that descriptor element 321*e* is associated with master element 322*a* due to the matching IP address (i.e., 192.168.0.1). Correlation module 320 may accordingly associate descriptor element 321*e* with master element 322*a*.

Next, IUM descriptor 306 is received. Correlation module 320 may determine that there is no descriptor element 321 associated with the information contained in IUM descriptor 306, and may therefore create descriptor element 321*f*. Correlation module 320 may then determine that descriptor element 321*f* is associated with master element 322*a* due to the matching IP address (i.e., 192.168.0.1). Correlation module 320 may accordingly associate descriptor element 321*f* with master element 322*a*.

Next, IUM descriptor 307 is received. Correlation module 320 may determine that there is no descriptor element 321 associated with the information contained in IUM descriptor 307, and may therefore create descriptor element 321g. Correlation module 320 may then determine that descriptor element 321g is associated with master element 322b due to the relationship indicated with "Computer2" (i.e., that the monitored component is a component of "Computer2"). Correlation module 320 may accordingly associate descriptor element 321g with master element 322b.

Next, IUM descriptor 308 is received. Correlation module 320 may determine that there is no descriptor element 321 associated with the information contained in IUM descriptor 308, and may therefore create descriptor element 321h. Correlation module 320 may then determine that descriptor element 321h is associated with master element 322c due to the matching IP address (i.e., 192.168.0.3). Correlation module 320 may accordingly associate descriptor element 321h with master element 322c.

Next, IUM descriptor 309 is received. Correlation module 320 may determine that there is no descriptor element 321 associated with the information contained in IUM descriptor 309, and may therefore create descriptor element 321i. Correlation module 320 may then determine that there is no master element 322 that may be associated with descriptor element 321i. This is because there is no master element 322 that matches any of the information contained in IUM descriptor 302/descriptor element 321i about the component or device being monitored (e.g., the IP address or device type information). Correlation module 320 may accordingly create master element 322d and associate descriptor element 321i with master element 322d. Correlation module 320 may also determine that descriptor element 321i is associated with master element 322b due to the indicated relationship with the device having IP address 192.168.0.2 (i.e., that the monitored device is connected to the device with IP address 192.168.0.2). Correlation module 320 may accordingly associate descriptor element 321i with master element 322b as well.

Next, IUM descriptor 310 is received. Correlation module 320 may determine that there is no descriptor element 321 associated with the information contained in IUM descriptor 310, and may therefore create descriptor element 321j. Correlation module 320 may then determine that descriptor element 321j is associated with master element 322a due to the matching IP address (i.e., 192.168.0.1). Correlation module 320 may accordingly associate descriptor element 321j with master element 322b.

If, thereafter, another IUM descriptor is received from a probe 38 with information that is associated with an already-existing descriptor element 321, correlation module 320 may determine as much and determine whether the received information differs from that in the associated descriptor element 321. If there is a difference, then correlation module 320 may update the information in descriptor element 321 to include the newly received information. For example, if a new IUM descriptor (not shown) is received that is similar to IUM descriptor 308, but indicates that the device at IP address 1912.168.0.3 has firmware version 1.1, then correlation module may update the firmware version in descriptor element 321h to indicate version 1.1 rather than version 1.0. This process may apply to any IUM descriptor received that is associated with an already-existing descriptor element 321.

After the correlation operation is complete, each of descriptor elements 321 may be associated with one or more master elements 322 as shown in FIG. 3. Although not shown, it will be understood that, in some embodiments, correlation module 320 may be a part of a correlation and reconciliation module such as correlation and reconciliation module 220 of FIG. 2. It will also be understood that, in other embodiments, the correlation module 320 may be separate from a reconciliation module (not shown).

Modifications, additions, or omissions may be made to the operation illustrated in FIG. 3 without departing from the scope of the invention. Additionally, the operation illustrated in FIG. 3 may include any number of host devices 14, peripheral devices 15, IUM descriptors, descriptor elements, master elements, and/or correlation modules. Furthermore, any suitable logic may perform the functions of system 300 illustrated in FIG. 3 and the components contained therein.

FIG. 4 illustrates an example method for correlating IUM descriptors 301-310 received from probes 38 on host devices 14 (and/or peripheral devices 15) as illustrated in FIG. 3 according to one embodiment of the present disclosure. The method may begin at step 410, where an IUM descriptor is received from a probe 38 on a host device 14 or peripheral device 15 at a correlation module 320, which may be operable to perform a correlation operation. For example, referring to FIG. 3, IUM descriptor 301 may be received at correlation module 320. At step 420, it is determined, for each IUM descriptor received, whether the descriptor has an associated descriptor element in the database. If the descriptor element exists, the method proceeds to step 430 where properties of the descriptor element are updated to include those of the more recently discovered IUM descriptor.

If, however, the descriptor element does not yet exists in the database, an associated descriptor element is created for the received IUM descriptor at step 440. For example, referring to FIG. 3, after receiving IUM descriptor 301, correlation module 320 may determine that descriptor element 321a does not yet exist and may create it. Next, it is determined at step 450 whether there is a master element 322 within the database that matches the descriptor element 321. In particular embodiments, whether a matching master element exists may be determined using one or more rules. In particular embodiments, this may include comparing the information in the descriptor element 321 with information in other descriptor elements 321 associated with the master element 322. In some embodiments, the rules may be hard-coded set of rules, while in other embodiments, rule definitions may allow for new rules to be created by users or administrators of system 300. Further, in particular embodiments, each rule may have a corresponding configuration setting that allows that rule to be enabled (which may be the default) or disabled. Disabled rules may be excluded from consideration accordingly. This may allow a user to adapt the rule set to the needs and constraints of a given organization. Rules may be based, in some embodiments, on the type of information contained in the received IUM descriptor. For example, if the IUM descriptor is monitoring device-level information, the rules may be based on the network address (e.g., IP or MAC address) of the device. In such instances, the rule may be that if the network address included in an IUM descriptor matches a network address in another IUM descriptor, then each IUM descriptor shall be associated with the same device (i.e., the descriptor elements 321 should be associated with the same master element 322). As another example, if the name of the device or component in the IUM descriptor (e.g., "Computer1" or "Computer2") matches the name included in another IUM descriptor, then those IUM descriptors shall be associated with the same device (i.e., the descriptor elements 321 should be associated with the same master element 322).

If no match is found at step 440, the method proceeds to step 450 where a new master element is created within the database, and then to step 460, where the descriptor element is associated with the master element in the database. For example, referring again to FIG. 3, this may include correlation module 320 determining that a master element does not yet exist for the device described in IUM descriptor 301/descriptor element 321a and creating new master element 322a in response. If a match is found at step 440, however, the method proceeds directly to step 460 and the descriptor element is associated with the matching master element.

Modifications, additions, or omissions may be made to method 400. Additionally, one or more steps in method 400 of FIG. 4 may be performed in parallel, in series, or in any suitable order. For example, steps 420-470 of method 400 may be performed for each element in parallel with one another. As another example, steps 420-470 of method 400 may alternatively be performed for each element in series with one another. Further, some of steps 420-470 of method 400 may be performed in series with one another, while others are performed in parallel with one another.

FIG. 5 illustrates an example reconciliation operation performed on correlated descriptor elements 321 and master elements 322 according to one embodiment of the present disclosure. In particular embodiments, the correlated descriptor elements 321 and master elements 322 may be received from a correlation module, such as correlation module 320 of FIG. 3. In particular embodiments, the descriptor elements 321 and 322 may be received at reconciliation module 520, which may be the same as or separate from correlation module 320. Once descriptor elements 321 and 322 are received at reconciliation module 520, reconciliation module 520 may locate each master element 322 and all associated descriptor elements 321. For example, reconciliation module 520 may first locate master element 322a, and then all associated descriptor elements (i.e., 321a, 321d, 321e, and 321f). Next, reconciliation module 520 may locate master element 322b and all its associated descriptor elements (i.e., 321b, 321c, 321i, and 321j). Next, reconciliation module 520 may locate master element 322c and all its associated descriptor elements (i.e., 321c, 321d, and 321h). Next, reconciliation module 520 may locate master element 322d and all its associated descriptor elements (i.e., 321c and 321i). After all master elements 322 and their associated descriptor elements 321 are located, reconciliation module 520 may then begin migrating or copying the information contained in the associated descriptor elements 321 to the master elements 322. If there is any conflicting information in the associated descriptor elements 321, then reconciliation module 520 may compare the conflicting information and reconcile the differences based on reconciliation rules and reconciliation rule priority (i.e., which reconciliation rules are looked at first) before migrating the data into the master element 322.

For example, for master element 322a, reconciliation module 520 may begin the reconciliation process by copying all the information from descriptor element 321a into master element 322a. This is because there may be no other information yet stored in master element 322a. Accordingly, after this step, master element 322a may indicate that the name of the device being monitored is "Computer1," that its IP address is 192.168.0.1, that it is a computing system, and that it runs an application.

Next, reconciliation module 520 may look at associated descriptor element 321d. Because the IP address information is already contained in the master element 322a (from descriptor element 321a), that information is not re-copied into master element 322a. However, because the relationship information has not yet been included in master element 322a, that information is copied into master element 322a. So, after this step, master element 322a may indicate that the name of the device being monitored is "Computer1," that its IP address is 192.168.0.1, that it is a computing system, that it runs an application, and that it is connected to Printer at 192.168.0.3.

Next, reconciliation module 520 may look to associated descriptor element 321e. Because the IP address information is already contained in the master element 322a (from descriptor element 321a), that information is not re-copied into master element 322a. Because the information about the device being composed of memory has not yet been included in master element 322a, that information is copied into master element 322a. However, there is now a discrepancy between the device type information, with descriptor element 321a saying that the device is a computing device and descriptor element 321e saying that the device is a virtual machine. Using one or more rules, reconciliation module 520 may determine that the device type information in descriptor element 321e is more specific than that of descriptor element 321a (i.e., that a virtual machine is a more specific descriptor of the device type than computing device), and may accordingly overwrite the device type information in master element 322a with the device type information from descriptor element 321e. Thus, after this step, master element 322a may indicate that the name of the device being monitored is "Computer1," that its IP address is 192.168.0.1, that it is a virtual machine, that it runs an application, that it is connected to Printer at 192.168.0.3, and that it is composed of memory.

Next, reconciliation module 520 may look to associated descriptor element 321f. Reconciliation module 520 may determine that the only new information not yet contained in master element 322a is the memory size information. Accordingly, reconciliation module 520 may update the memory information in master element 322a such that it shows the memory as having a size of 2 GB. Thus, after this step, master element 322a may indicate that the name of the device being monitored is "Computer1," that its IP address is 192.168.0.1, that it is a virtual machine, that it runs an application, that it is connected to Printer at 192.168.0.3, and that it is composed of 2 GB of memory.

Next, reconciliation module 520 may look to associated descriptor element 321j. Reconciliation module 520 may determine that the only new information not yet contained in master element 322a is the software name information. Accordingly, reconciliation module 520 may update the memory information in master element 322a such that it shows that the device runs "App1" (instead of a generic application). Thus, after this step, master element 322a may indicate that the name of the device being monitored is "Computer1," that its IP address is 192.168.0.1, that it is a virtual machine, that it runs "App1" software, that it is connected to Printer at 192.168.0.3, and that it is composed of 2 GB of memory.

After merging the relevant information into master element 322a, reconciliation module 520 may then move onto master element 322b. For master element 322b, reconciliation module 520 may begin the reconciliation process by copying all the information from descriptor element 321b into master element 322b. This is because there may be no other information yet stored in master element 322b. Accordingly, after this step, master element 322b may indicate that the name of the device being monitored is "Computer2," that its IP address is 192.168.0.2, and that it is a computing system.

Next, reconciliation module 520 may look at associated descriptor element 321c. Because the IP address information is already contained in the master element 322b (from descriptor element 321b), that information is not re-copied into master element 322a. However, because the remaining information has not yet been included in master element 322b, that information is copied into master element 322b. In particular embodiments, though, reconciliation module 520 may recognize from descriptor element 321d that the IP device at 192.168.0.3 is actually a printer, and, because a "printer" is a more specific description of the device than "IP device," may accordingly import that information into master element 322b (i.e., may indicate that the device represented by master element 322b is connected to a printer rather than just an IP device. So, after this step, master element 322b may indicate that the name of the device being monitored is "Computer2," that its IP address is 192.168.0.2, that it is a server, that it runs a "Application2" software, that it is composed of a processor, that it is connected to a Printer at 192.168.0.3, and that it is connected to an IP device at 192.168.0.4.

Next, reconciliation module 520 may look at associated descriptor element 321g. Because the information about the device being composed of a processor with a speed of 2 GHz has not yet been included in master element 322b, reconciliation module 520 may copy that into master element 322b. So, after this step, master element 322b may indicate that the name of the device being monitored is "Computer2," that its IP address is 192.168.0.2, that it is a server, that it runs a "Application2" software, that it is composed of a processor with a speed of 2 GHz, that it is connected to a Printer at 192.168.0.3, and that it is connected to an IP device at 192.168.0.4.

Next, reconciliation module 520 may look at associated descriptor element 321i. Because the relationship information has not yet been included in master element 322a, reconciliation module 520 may copy that information into master element 322b. So, after this step, master element 322b may indicate that the name of the device being monitored is "Computer2," that its IP address is 192.168.0.2, that it is a server, that it runs a "Application2" software, that it is composed of a processor with a speed of 2 GHz, that it is connected to a Printer at 192.168.0.3, and that it is connected to a Storage device at 192.168.0.4.

After merging the relevant information into master element 322b, reconciliation module 520 may then move onto master element 322c. For master element 322c, reconciliation module 520 may begin the reconciliation process by copying all the relevant information about the device represented by master element 322c from descriptor element 321c into master element 322c. This is because there may be no other information yet stored in master element 322c. Accordingly, after this step, master element 322c may indicate that the device being monitored is an IP device with IP address 192.168.0.3, which is connected to a server at 192.168.0.2.

Next, reconciliation module 520 may look at associated descriptor element 321d. Reconciliation module 520 may determine that the new information contained in this descriptor element is that the device represented by master element 322c is a Printer, and that it is additionally connected to a device at 192.168.0.1. Accordingly, reconciliation module 520 may determine that it should import the device type information (i.e., that the device is a printer) and the new relationship information. So, after this step, master element 322c may indicate that the device being monitored is a Printer with IP address 192.168.0.3, which is connected to a server at 192.168.0.2 and another device at 192.168.0.1.

Next, reconciliation module 520 may look at associated descriptor element 321h. Reconciliation module 520 may determine that the only new information contained in this descriptor element is the firmware version information, and may accordingly import only that information into master element 322c. So, after this step, master element 322c may indicate that the device being monitored is a Printer running firmware version 1.0 with IP address 192.168.0.3, which is connected to a server at 192.168.0.2 and another device at 192.168.0.1.

After merging the relevant information into master element 322c, reconciliation module 520 may then move onto master element 322d. For master element 322d, reconciliation module 520 may begin the reconciliation process by copying all the relevant information about the device represented by master element 322d from descriptor element 321c into master element 322d. This is because there may be no other information yet stored in master element 322d. Accordingly, after this step, master element 322d may indicate that the device being monitored is an IP device with IP address 192.168.0.4, which is connected to a server at 192.168.0.2.

Next, reconciliation module 520 may look at associated descriptor element 321i. Reconciliation module 520 may determine that the new information contained in this descriptor element is the device type information (i.e., that it is a storage device), and may accordingly import that information into master element 322d. So, after this step, master element 322d may indicate that the device being monitored is a Storage device with IP address 192.168.0.4, which is connected to a server at 192.168.0.2.

After all the relevant information from the descriptor elements 321 has been merged into the master elements 322, the relationships indicated in the descriptor elements 321 (and now merged into the master elements 322) are promoted or transferred to the master elements 322 such that the relationships are indicated between the master elements 322. For example, rather than master element 322a indicating that the device it represents is connected to the Printer at 192.168.0.3, reconciliation module 520 may determine that the device is represented by master element 322c and accordingly associate master elements 322a and 322c with each other in the database. The same process may occur for each master element 322 in the database.

In addition, any information for each master element 322 not already discovered from the process described above may be imported. For example, after the process above, master element 322c may indicate that the device being monitored is a Printer running firmware version 1.0 with IP address 192.168.0.3, which is connected to a server at 192.168.0.2 and another device at 192.168.0.1. However, now that master element 322c is associated with master elements 322a and 322b, reconciliation module 520 may update the information in master element 322c to indicate that its device is connected to "Computer2" (rather than merely a server at 192.168.0.2) and "Computer1" (rather than merely a device at 192.168.0.1). The same process may occur for each master element 322 in the database.

Once all master elements 322 have been updated using the reconciliation process described above, master IUM descriptors 532 may be published into the database as shown in FIG. 5. The master IUM descriptors 532 may include or represent the most up-to-date information in or associated with master elements 322, and may be accessed by a user or administrator interested in information about one or more of the monitored host devices or peripheral devices being monitored on the network. For instance, if the user wanted to view information about "Computer1," he or she may only need to access master IUM descriptor 532a (instead of accessing each of IUM descriptors 301, 304, 305, 306, and 310 of FIG. 3). It will be understood that master elements 322 and master IUM descriptors 532 may be different objects from one another, which may allow for future changes to master elements 322 through future correlation operations (e.g. adding or removing IUM descriptors associated with master elements 322)

without disturbing the published master IUM descriptors 532 until another reconciliation operation has been performed on the updated master elements 322.

Modifications, additions, or omissions may be made to the operation illustrated in FIG. 5 without departing from the scope of the invention. Additionally, the operation illustrated in FIG. 5 may include any number of host devices 14, peripheral devices 15, IUM descriptors, descriptor elements, master elements, master IUM descriptors, and/or reconciliation modules. Furthermore, any suitable logic may perform the functions of system 500 illustrated in FIG. 5 and the components contained therein.

FIG. 6 illustrates an example method 600 for reconciling correlated descriptor elements 321 and master elements 323 as illustrated in FIG. 5 according to one embodiment of the present disclosure. The method may begin at step 610, where a master element is found or located in the database. The method then proceeds to step 620 where each descriptor element associated with the master element is located. These steps may be performed by a reconciliation module such as reconciliation module 520 of FIG. 5. Referring to FIG. 5, this may refer to locating master element 322a, determining that it is a master element, and then locating each of associated descriptor elements 321a, 321d, 321e, 321f, and 321j. The associated descriptor elements may be located, in some embodiments, based on the associations made by a correlation module such as correlation module 320 of FIG. 3.

Next, at step 630, it is determined whether there is information in each associated descriptor element 321 that may conflict with information in another associated descriptor element 321. This step may be performed by a reconciliation module (such as reconciliation module 520 of FIG. 5). For example, referring to FIG. 5, reconciliation module 520 may determine, when looking at descriptor elements 321b and 321c associated with master element 322b, that the device type information in each is in conflict. If there is no conflicting information, the method proceeds to step 640 where non-conflicting information in the descriptor elements may be copied into the master element. For example, referring to FIG. 5, the information about the device represented by master element 322b in descriptor elements 321g (i.e., the processor information) and 321i (i.e., the relationship information) is not conflicting, and is therefore copied into master element 322b by reconciliation module 520.

If, however, there is conflicting information between certain information in the descriptor elements 321, then the method proceeds to step 650 where a priority is determined for each piece of conflicting information in the descriptor elements 321 associated with the master element 322. This may be done according to one or more rules. In some embodiments, the one or more rules may have a priority of execution, i.e., a certain reconciliation rule may be run first on conflicting data before another is run on the conflicting data. The rules and rule priority may be predetermined in some embodiments, and may be set out by an administrator of the system being monitored in other embodiments. In particular embodiments, the rules may indicate that more detailed elements are given higher priority over those that are less detailed. In certain embodiments, a score may be given to the element that indicates its priority. For example, referring to FIG. 5, descriptor elements 321b and 321c may be determined to be conflicting because descriptor element 321b indicates that the device at IP address 192.168.0.2 is merely a computing device, while descriptor element 321c indicates that the device at IP address 192.168.0.2 is a server. Because "server" is a more specific/more detailed description of the device over "computing device," the rules may allow for the device type information in descriptor element 321c to have higher priority than the device type information in descriptor element 321b.

In some embodiments, the conflict may come from descriptor elements that do not necessarily monitor the device represented by a master element 322. For example, for master element 322c, the more specific device type information (i.e., "printer") in descriptor element 321d (which may come from a probe that is monitoring the device at 192.168.0.1, not the printer at 192.168.0.3) may be given higher priority over the less specific device type information (i.e., "IP device") in descriptor element 321c (which may come from a probe that is monitoring the device at 192.168.0.2, not the printer at 192.168.0.3). In this example, both instances of device type information come from probes monitoring devices other than the one for master element 322c).

Once a priority is determined for the conflicting information, the method then proceeds to step 660, where the highest priority conflicting information from descriptor elements 321 is copied into the master element 322. Using the above example from FIG. 5 with descriptor elements 321b and 321c, the device type information in descriptor element 321c may be copied into master element 322b instead of the device type information in 321b because the device type information in descriptor element 321c was determined to have higher priority than the device type information in descriptor element 321b. Once that is complete, the method proceeds to step 670 where the remaining information from the conflicting descriptor elements 321 is merged into the associated master element 322. For example, referring to FIG. 5, the name information from descriptor element 321b and the software (i.e., "runs: "Application2") information from descriptor element 321c do not conflict with information in the other descriptor element and are therefore copied into master element 322b after the conflicts between those two descriptor elements have been.

Once all relevant information has been copied or merged from descriptor elements 321 into the associated master elements 322, then the method proceeds to step 680, where relationships are created or modified between the master elements 322. In particular embodiments, this may be done according to the relationship information that was copied or merged into the master elements 322 from the descriptor elements 321. For example, referring to FIG. 5, rather than master element 322a indicating that the device it represents is connected to a Printer at 192.168.0.3, reconciliation module 520 may determine that that printer is represented by master element 322c and accordingly associate master elements 322a and 322c with each other in the database.

Modifications, additions, or omissions may be made to method 60. Additionally, one or more steps in method 60 of FIG. 6 may be performed in parallel, in series, or in any suitable order. For example, steps 630-670 of method 600 may be performed for each element in parallel with one another. As another example, steps 630-670 of method 600 may alternatively be performed for each element in series with one another. Further, some of steps 630-670 of method 600 may be performed in series with one another, while others are performed in parallel with one another.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
    determining that first probe information is associated with first device information based on the first probe information, the first device information comprising information about a first device, the first probe information being associated with a first probe installed on the first device and comprising information about a first property of the first device;
    determining that second probe information is associated with the first device information and second device information based on the second probe information, the second probe information being associated with a second probe installed on the first device, the second probe information comprising information about a second property of the first device and information about a first property of a second device;
    determining that third probe information is associated with second device information based on the third probe information, the third probe information being associated with a third probe installed on a second device and comprising information about a second property of the second device;
    modifying the first device information to include particular information from the first probe information and particular information from the second probe information; and
    modifying the second device information to include particular information from the second probe information and particular information from the third probe information.

2. The method of claim 1, wherein the information in the first probe information conflicts with information in the second probe information.

3. The method of claim 2, further comprising determining a priority of the first probe information and a priority of the second probe information.

4. The method of claim 3, wherein modifying the first device information to include particular information in the first probe information and particular information in the second probe information is based on the priority of the first probe information and the priority of the second probe information.

5. The method of claim 4, wherein:
    the priority of the first probe information is greater than the priority of the second probe information; and
    modifying the first device information comprises copying all of the first probe information into the first device information and copying only a portion of the second probe information into the first device information.

6. The method of claim 1, wherein the second probe information includes information regarding a relationship between the first device and the second device.

7. The method of claim 6, wherein:
    modifying the first device information comprises generating a relationship between the first device information and the second device information; and
    modifying the second device information comprises generating a relationship between the first device information and the second device information.

8. A system, comprising:
    a memory operable to store instructions;
    a processor communicatively coupled to the memory and operable, upon executing the instructions, to:
    determine that first probe information is associated with first device information based on the first probe information, the first device information comprising information about a first device, the first probe information being associated with a first probe installed on the first device and comprising information about a first property of the first device;
    determine that second probe information is associated with the first device information and second device information based on the second probe information, the second probe information being associated with a second probe installed on the first device, the second probe information comprising information about a second property of the first device and information about a first property of a second device;
    determine that third probe information is associated with second device information based on the third probe information, the third probe information being associated with a third probe installed on a second device and comprising information about a second property of the second device;
    modify the first device information to include particular information from the first probe information and particular information from the second probe information; and
    modify the second device information to include particular information from the second probe information and particular information from the third probe information.

9. The system of claim 8, wherein the information in the first probe information conflicts with information in the second probe information.

10. The system of claim 9, wherein the processor is further operable, upon executing the instructions, to determine a priority of the first probe information and a priority of the second probe information.

11. The system of claim 10, wherein the processor operable to modify the first device information to include particular information in the first probe information and particular information in the second probe information is operable to modify the first device information based on the priority of the first probe information and the priority of the second probe information.

12. The system of claim 11, wherein:
the priority of the first probe information is greater than the priority of the second probe information; and
the processor operable to modify the first device information is further operable to copy all of the first probe information into the first device information and copy only a portion of the second probe information into the first device information.

13. The system of claim 8, wherein the second probe information includes information regarding a relationship between the first device and the second device.

14. The system of claim 13, wherein:
the processor operable to modify the first device information is further operable to generate a relationship between the first device information and the second device information; and
the processor operable to modify the second device information is further operable to generate a relationship between the first device information and the second device information.

15. A computer program product comprising a computer readable storage medium having computer readable program code embodied therewith, the computer readable program code comprising:
computer-readable program code configured to determine that first probe information is associated with first device information based on the first probe information, the first device information comprising information about a first device, the first probe information being associated with a first probe installed on the first device and comprising information about a first property of the first device;
computer-readable program code configured to determine that second probe information is associated with the first device information and second device information based on the second probe information, the second probe information being associated with a second probe installed on the first device, the second probe information comprising information about a second property of the first device and information about a first property of a second device;
computer-readable program code configured to determine that third probe information is associated with second device information based on the third probe information, the third probe information being associated with a third probe installed on a second device and comprising information about a second property of the second device;
computer-readable program code configured to modify the first device information to include particular information from the first probe information and particular information from the second probe information; and
computer-readable program code configured to modify the second device information to include particular information from the second probe information and particular information from the third probe information.

16. The computer program product of claim 15, wherein the information in the first probe information conflicts with information in the second probe information.

17. The computer program product of claim 16, wherein the computer readable program code further comprises computer-readable program code configured to determine a priority of the first probe information and a priority of the second probe information.

18. The computer program product of claim 17, wherein the computer-readable program code configured to modify the first device information to include particular information in the first probe information and particular information in the second probe information is configured to modify the first device information based on the priority of the first probe information and the priority of the second probe information.

19. The computer program product of claim 18, wherein:
the priority of the first probe information is greater than the priority of the second probe information; and
the computer-readable program code configured to modify the first device information is further configured to copy all of the first probe information into the first device information and copy only a portion of the second probe information into the first device information.

20. The computer program product of claim 15, wherein the second probe information includes information regarding a relationship between the first device and the second device.

21. The computer program product of claim 20, wherein:
the computer-readable program code configured to modify the first device information is further configured to generate a relationship between the first device information and the second device information; and
the computer-readable program code configured to modify the second device information is further configured to generate a relationship between the first device information and the second device information.

* * * * *